United States Patent [19]

Peiffer et al.

[11] Patent Number: 5,560,948
[45] Date of Patent: Oct. 1, 1996

[54] RESIN-CONTAINING, BIAXIALLY ORIENTED, MULTILAYER POLYPROPYLENE FILM, PROCESS FOR THE PRODUCTION THEREOF, AND THE USE THEREOF

[75] Inventors: Herbert Peiffer, Mainz; Ursula Murschall, Nierstein; Thomas Dries, Schwabenheim; Gunter Schloegl, Kelkheim, all of Germany

[73] Assignee: Hoechst Aktiengesellschaft, Frankfurt am Main, Germany

[21] Appl. No.: 249,292

[22] Filed: May 25, 1994

[30] Foreign Application Priority Data

May 29, 1993 [DE]  Germany ................ 43 18 031.0

[51] Int. Cl.⁶ .................................................. B32B 27/08
[52] U.S. Cl. .................. 426/127; 426/106; 426/415; 428/357; 428/910; 428/515; 428/516; 428/517; 428/521
[58] Field of Search ....................... 428/515, 516, 428/517, 521, 910, 35.7; 264/171; 426/127, 106, 415

[56] References Cited

U.S. PATENT DOCUMENTS

| | | | |
|---|---|---|---|
| 3,666,836 | 5/1972 | John | 260/897 A |
| 4,289,831 | 9/1981 | Last | 428/515 |
| 4,622,237 | 11/1986 | Lori | 427/40 |
| 4,786,533 | 11/1988 | Crass et al. | 428/13 |
| 4,921,749 | 5/1990 | Bossaert et al. | 428/216 |
| 5,236,622 | 8/1993 | Yoneda et al. | 252/309 |
| 5,246,659 | 9/1993 | Crighton et al. | 264/290.2 |
| 5,292,563 | 3/1994 | Peiffer et al. | 428/35.9 |

FOREIGN PATENT DOCUMENTS

| | | |
|---|---|---|
| 1231861 | 5/1971 | United Kingdom . |
| 2055688 | 3/1981 | United Kingdom . |
| 2201407 | 9/1988 | United Kingdom . |

OTHER PUBLICATIONS

Kuehne, "Packaging using Plastics", Carl–Hanser–Verlag, Munich, p. 63, (1974).

Ullmanns, "Ullmann's Encyclopedia of Industrial Chemistry", 4th Edition, vol. 12, (1976), pp. 525–555.

*Primary Examiner*—Paul J. Thibodeau
*Assistant Examiner*—Mary Critharis
*Attorney, Agent, or Firm*—Foley & Lardner

[57] ABSTRACT

A multilayer polypropylene film which includes at least one base layer containing propylene polymer or a propylene polymer mixture and resin, and at least one outer layer containing α-olefinic polymers having 2 to 10 carbon atoms is disclosed. The resin has a mean molecular weight of $\geq 1500$. The invention also relates to a process for the production of the multilayer film, and to the use of the film in a twist wrapping process.

20 Claims, 4 Drawing Sheets

FIG. 4

RESIN-CONTAINING, BIAXIALLY ORIENTED, MULTILAYER POLYPROPYLENE FILM, PROCESS FOR THE PRODUCTION THEREOF, AND THE USE THEREOF

BACKGROUND OF THE INVENTION

1. Field of the Invention

The invention relates to multilayer propylene polymer film which comprises at least one base layer comprising propylene polymer or a propylene polymer mixture and resin, and at least one outer layer comprising α-olefinic polymers having 2 to 10 carbon atoms.

The film according to the invention is distinguished by good twist behavior and very good migration properties.

The invention furthermore relates to a process for the production of the multilayer film and to the use of the film.

2. Description of the Related Art

A particular type of full wrapping closure for the purpose of packaging is twist wrapping. This packaging method is useful in the full wrapping of relatively small objects, and is particularly preferred for round or virtually round articles such as candy, bottles, candles, roll-packed confectionery, bars of chocolate and marzipan, Easter eggs or the like.

The prerequisite for use of the film in this area of application is its twist capacity. The resilience of the film must not result in it twisting back again after the pleat has been twisted, which means that the packaged goods can easily fall out. According to the known art, twist wrappings are made predominantly from cellophane, i.e., regenerated cellulose, un-oriented polypropylene or PVC film. For example, see "Verpacken mit Kunststoffen" [Packaging using Plastics] by Günther Kühne, published 1974, Carl-Hanser-Verlag, Munich, page 63.

Very recently, polypropylene films which have been biaxially oriented to different extents have been proposed for use in twist wrapping. These films contain a low-molecular-weight resin in order to achieve the desired twist properties. However, these known twist wrapping films have unsatisfactory migration behavior. It is known that certain additives which are added to the base layer of polypropylene films migrate to the surface after a certain time. This migration is desirable since the migrating additives develop an advantageous effect on the surface of the film.

DE-C-20 45 115 describes the use of hydrogenated polymer resins in unsupported polyolefin films, where the hydrogenated, vinyl aromatic hydrocarbon resins have a mean molecular weight distribution such that not more than about 15% of the polymer has a molecular weight (Mw) outside the range from 600 to 20,000. It is stated that the compatibility of the resin having an Mw of greater than 20,000 drops considerably and resin having an Mw of less than 600 makes the film tacky. Within the range from 600 to 20,000, the mean molecular weight is not crucial. The addition of resin imparts heat-sealing properties to the polyolefin. The polyolefin itself can only be heat-sealed with difficulty, or not at all.

GB-A-1,231,861 describes a biaxially oriented polypropylene (boPP) film which has good twist properties achieved by mixing the propylene homopolymer with a low-molecular-weight resin and by preferential orientation in the machine direction. Low-molecular-weight resins described are terpene polymers, compatible hydrogenated hydrocarbon resins or compatible rosins. The resins are characterized by their molecular weight, by their softening point and by their iodine number. Accordingly, preferred resins are those which have a molecular weight of greater than 600, a softening point of greater than 100° C. and an iodine number of less than 15. An example mentioned of a typical resin is Picopale 100 having a molecular weight of about 1170, a softening point of about 100° C. and an iodine number of 200.

The resins described are highly compatible with the propylene homopolymer and can contribute to good mechanical properties and very good twist properties.

The resin, which has a very low molecular weight compared with the propylene homopolymer, has considerable disadvantages with respect to its preparation, processing and use in polypropylene films. The resin tends to separate out and diffuse to the surface of the film. During the production process, this can result in an increased tendency of the film to stick. Deposition of the resin, such as, on rolls can also result. During processing, the packaged objects, such as candy, tend to block, which prevents or restricts their further transport.

Another serious disadvantage of the low-molecular-weight resins in the wrapping film occurs when the film is in contact with packaged contents, in particular with fat-containing contents. The resin migrates into the food after a short time, which is prohibited by food regulations. Films which contain migrating low-molecular-weight resins of this type therefore cannot be used for packaging fat-containing foods.

EP-A-0 217 388 describes a film which is also distinguished by good twist properties. In order to achieve the good twist behavior, a low-molecular-weight resin is added to the propylene homopolymer in the base layer. In addition, the process conditions are selected so that the modulus of elasticity in both orientation directions is greater than 3000 N/mm$^2$. In the example, the resin mentioned is Arkon P 125, which has a molecular weight of about 1000 and a softening point of 125° C. In addition to the above-mentioned advantages, this resin has significant disadvantages in the production of films, in the processing of films and on contact of the film with fat-containing foods.

Although the films described are covered with non-resin-containing outer layers, diffusion of the resin to the surface of the film still occurs even on contact with hot rolls (for example during longitudinal stretching) such that deposition of the resin on the roll surfaces can occur relatively quickly. The machine must be frequently cleaned, which results in significant loss in capacity.

Furthermore, these resins also have a very pronounced migration behavior. On contact of the film with fat, virtually all the resin present in the film has migrated into the fat, for example, after a test time of 10 days at a test temperature of 40° C.

GB-A-2,055,688 describes a multilayer, heat-sealable, transparent biaxially-oriented polypropylene (boPP) film, which has good mechanical properties and good heat-sealing properties. In order to improve the mechanical properties, the base layer contains a low-molecular-weight resin in addition to propylene homopolymer. The resin content is from 2 to 20% by weight. The outer layers essentially comprise a mixture of at least two copolymers which give the film excellent heat-sealability. The film is biaxially stretched, using both stepwise stretching and simultaneous stretching. The latter type of stretching is expensive, but can result in good twist properties of the film. However, in the examples, the resin mentioned is Arkon P 125, which has a molecular weight of about 1000, and therefore has the above-described extreme disadvantages with respect to diffusion and migration behavior.

GB-A-2,028,168 describes a heat-sealable boPP film which has very good mechanical properties. In order to improve the mechanical properties, the base layer contains a low-molecular-weight hydrocarbon resin in addition to the propylene homopolymer. The resin content is from 1 to 50% by weight. The resin used has a molecular weight of greater than 600, preferably 1000, and a softening point of greater than 70° C. Due to the relatively low molecular weight of the resin used, the above-described disadvantages are expected.

U.S. Pat. No. 4,921,749 describes a heat-sealable boPP film which has improved mechanical and optical properties. The heat-sealability of the film and the water vapor and oxygen permeability have likewise been improved. All the improvements result from the addition of a low-molecular-weight resin to the base layer. The resin content is between 3 and 30% by weight. The resin has a molecular weight of significantly less than 5000, preferably less than 1000, for example, 600. The softening point of the resin is from 120° to 140° C. Due to the stated stretching ratios of 5:1 in the machine direction and 10:1 in the transverse direction, the film has only limited suitability for twist wrapping. The low molecular weight of the resin means that the above described problems of diffusion of the resin through the film and migration into the food are very high.

EP-A-0 317 276 discloses a boPP film for twist application which contains a propylene homopolymer and a hydrocarbon resin in the base layer. The concentration of the resin is between 1 and 40% by weight. Due to the formulation chosen, the film is said to be distinguished by good deadfold properties and to be suitable for use as a twist film. The resin used is, for example, a $C_9$-terpolymer (Arkon P 125), which has a molecular weight of about 1000. The disadvantages of a resin of this type were described above.

SUMMARY OF THE INVENTION

One object of the present invention is to provide a resin-containing multilayer film which has good twist behavior for twist wrapping and does not result in an increase in the concentration of resin in packaged fat-containing foods. At the same time, the other film properties required for use as a packaging film should not be impaired, i.e., the film should have, for example, good transparency, high sheen and good scratch resistance.

Another object of the present invention is to provide a process for the production of the multilayer film by a coextrusion process. Still another object of the present invention is to provide a packaged article that is twist wrapped by the multilayer film.

In accomplishing the foregoing objectives, there has been provided according to one aspect of the present invention a multilayer propylene polymer film which includes at least one base layer and at least one outer layer. The base layer contains a propylene polymer or a propylene polymer mixture and a resin. The outer layer contains α-olefinic polymers having 2 to 10 carbon atoms. The resin of the base layer has a mean molecular weight of ≧ about 1500. Preferably, the resin has a mean molecular weight of 2000 to 8000. In another preferred embodiment, the proportion of resin having a molecular weight less than 1000 is at most about 35%, preferably from 1 to 30%, based on the total weight of the resin.

In yet another preferred embodiment, the multilayer film has a permanent set value in the longitudinal and transverse directions of greater than about 50%.

The present invention also provides a process for the production of the multilayer propylene polymer film. The process includes the steps of: (i) coextruding the melts corresponding to the individual layers of the film through a flat film die; (ii) taking the coextruded film off over a take-off roll whose temperature is between about 10° and 100° C.; (iii) biaxially stretching the film at a longitudinal stretching ratio from about 5:1 to 9:1 and a transverse stretching ratio from about 5:1 to 9:1; (iv) heat-setting the biaxially stretched film; (v) optionally corona-treating the film; and (vi) winding the film up.

The present invention also provides for a packaged article that includes an article twist wrapped by the multilayer film.

Further objects, features and advantages of the present invention will become apparent to persons skilled in the art from the detailed description of preferred embodiments that follows.

DETAILED DESCRIPTION OF THE PREFERRED EMBODIMENTS

The present invention comprises a multilayer film of the generic type mentioned above, wherein the resin has a mean molecular weight of ≧ about 1500.

Study of packaged fat-containing foods has shown that resins having a mean molecular weight of less than 1500 migrate into the fat-containing food, where they increase in concentration. This effect is extremely undesirable and profoundly restricts the use of many resin-containing films for food packaging. Surprisingly, migration of the resin is prevented if resins having a mean molecular weight of ≧1500 are employed in the film.

The base layer of the multilayer film according to the invention essentially comprises a propylene polymer or a propylene polymer mixture in addition to the resin according to the invention.

Generally the base layer comprises 60 to 95% by weight, preferably 60 to 90% by weight, more preferably 65 to 85% by weight, based on the weight of the base layer, of a propylene polymer.

Any known propylene polymer or mixtures of propylene polymers with other polymers can be used in the base layer. A propylene polymer generally has at least about 50% propylene. Preferably, the propylene polymer of the base layer comprises predominantly (at least about 90%) propylene and preferably has a melting point of about 140° C. or above, more preferably from about 150° to 170° C. Isotactic homopolypropylene having an n-heptane-soluble content of about 6% by weight or less, based on the isotactic homopolypropylene, copolymers of ethylene and propylene having an ethylene content of about 10% by weight or less, copolymers of propylene with $C_4$-$C_8$-α-olefins having an α-olefin content of 10% by weight or less are particularly preferred propylene polymers for the base layer. Isotactic homopolypropylene is particularly preferred. The percentages by weight stated relate to the particular copolymer. The propylene polymer of the base layer generally has a melt flow index from about 0.5 g/10 min to 8 g/10 min, preferably from about 2 g/10 min to 5 g/10 min at 230° C. and a force of 21.6 N (DIN 53 735).

The propylene polymer employed in the base layer may be partially degraded by addition of organic peroxides. A measure of the degree of degradation of the polymer is the degradation factor A, which gives the relative change in the melt flow index, measured in accordance with DIN 53 735, of the propylene polymer, based on the starting polymer.

$$A = \frac{MFI_2}{MFI_1}$$

$MFI_1$=melt flow index of the propylene polymer before addition of the organic peroxide $MFI_2$=melt flow index of the propylene polymer degraded by peroxide.

In general, the degradation factor A of the propylene polymer employed is in the range from about 3 to 15, preferably from about 6 to 10.

Particularly preferred organic peroxides are dialkyl peroxides, where the term alkyl radical is defined as a conventional saturated, straight-chain or branched lower alkyl radical having up to six carbon atoms. Particular preference is given to 2,5-dimethyl-2,5-di(t-butylperoxy)hexane and di-t-butyl peroxide.

The base layer of the film according to the invention contains the resin described above having a molecular weight of ≧ about 1500, preferably from about 1800 to 8000, in particular from about 2000 to 6500. The resin is generally present in an amount to provide satisfactory twist properties. The resin is preferably present in an amount from about 5 to 40% by weight, more preferably from about 10 to 40% by weight, even more preferably from about 15 to 35% by weight, based on the weight of the base layer. The selection of a relatively high-molecular-weight resin having a mean molecular weight of at least about 1500 is essential for the improved migration behavior. It has been found that constituents of the resin having a molecular weight of less than 1000 migrate particularly well. Therefore, it is essential to the invention that the resin has a mean molecular weight of at least about 1500. It is particularly advantageous if the resin employed contains only small amounts having a molecular weight of less than 1000. These amounts should if possible be less than about 35% by weight, preferably less than about 30% by weight, more preferably less than about 25% by weight, in each case based on the weight of the resin.

Any desired resin can be used with the base layer. Preferred resins are in particular hydrocarbon resins. The hydrocarbon resins may be partially or fully hydrogenated. Suitable resins are basically synthetic resins or resins of natural origin. It has proven particularly advantageous to employ resins having a softening point of ≧ about 80° C. (measured in accordance with DIN 1995-U4 or ASTM E-28), those having a softening point from about 100° to 180° C., particularly from about 120° to 160° C., being preferred. The resin is preferably incorporated into the film in the form of a masterbatch, which is introduced into the extruder (for example a single-screw or cascade extruder). Examples of conventional masterbatches are those containing from about 30 to 70% by weight, preferably from about 50% by weight, of propylene homopolymer; and from about 70 to 30% by weight, preferably from about 50% by weight, of hydrocarbon resin. The data in percent by weight relate to the total weight of propylene polymer and hydrocarbon resin.

Of the numerous resins, hydrocarbon resins are preferred, particularly in the form of petroleum resins, styrene resins, cyclopentadiene resins and terpene resins (these resins are described in Ullmanns Encyklopädie der techn. Chemie [Ullmann's Encyclopedia of Industrial Chemistry], 4th Edition, Volume 12, pages 525 to 555).

The petroleum resins are those hydrocarbon resins prepared by polymerization of deep-decomposed petroleum materials in the presence of a catalyst. These petroleum materials usually contain a mixture of resin-forming substances, such as styrene, methylstyrene, vinyltoluene, indene, methylindene, butadiene, isoprene, piperylene and pentylene. The styrene resins are homopolymers of styrene or methylstyrene or copolymers of styrene or methylstyrene with other monomers such as vinyltoluene and butadiene. The cyclopentadiene resins are cyclopentadiene homopolymers or cyclopentadiene copolymers obtained from coal tar distillates and fractionated petroleum gas. These resins are prepared by keeping the materials containing cyclopentadiene at high temperature for long periods of time. Depending on the reaction temperature, dimers, trimers or oligomers can be obtained.

The terpene resins are polymers of terpenes, i.e., hydrocarbons of the formula $C_{10}H_{16}$, which are present in virtually all essential oils or oil-containing resins from plants, and phenol-modified terpene resins. Specific examples of terpenes which may be mentioned are pinene, α-pinene, dipentene, limonene, myrcene, camphene and similar terpenes. The hydrocarbon resins can also be so-called modified hydrocarbon resins. The modification is generally carried out by reaction of the raw materials before the polymerization, by the introduction of specific monomers or by reaction of the polymerized product, in particular by hydrogenation or partial hydrogenation.

Further useful hydrocarbon resins include styrene homopolymers, styrene copolymers, cyclopentadiene homopolymers, cyclopentadiene copolymers and/or terpene polymers having a softening point of in each case above 100° C. (in the case of unsaturated polymers, the hydrogenated product is preferred). Particular preference is given in the base layer to cyclopentadiene polymers having a softening point of about 140° C. or above.

The multilayer film according to the invention contains at least one outer layer comprising polymers formed from α-olefins having 2 to 10 carbon atoms. Any α-olefin polymer can be used.

Generally the cover layer comprises 60 to 100% by weight, preferably 70 to 98% by weight, more preferably 80 to 95% by weight, based on the weight of the cover layer, of α-olefin polymer.

In general, the outer layer comprises a propylene homopolymer or a copolymer of
  ethylene and propylene or
  ethylene and butylene or
  propylene and butylene or
  ethylene and another α-olefin having 5 to 10 carbon atoms or
  propylene and another α-olefin having 5 to 10 carbon atoms or a terpolymer of
  ethylene and propylene and butylene or
  ethylene and propylene and another α-olefin having 5 to 10 carbon atoms or a mixture of two or more of said homopolymers, copolymers and terpolymers or a blend of two or more of said homopolymers, copolymers and terpolymers, if desired mixed with one or more of said homopolymers, copolymers and terpolymers.

The outer layer preferably comprises a propylene homopolymer or a copolymer of
  ethylene and propylene or
  ethylene and 1-butylene or
  propylene and 1-butylene or a terpolymer of
  ethylene and propylene and 1-butylene or a mixture of two or more of said preferred homopolymers, copolymers and terpolymers or a blend of two or more of said preferred homopolymers, copolymers and terpolymers, if desired mixed with one or more of said homopolymers, copolymers and terpolymers.

Particular preference is given to propylene homopolymers or random ethylene-propylene copolymers having
  an ethylene content from about 2 to 10% by weight, preferably from about 5 to 8 % by weight, or random propylene-1-butylene copolymers having
  a butylene content from about 4 to 25% by weight, preferably from about 10 to 20% by weight, in each case based on the total weight of the copolymer, or random ethylene-propylene-1-butylene terpolymers having
  an ethylene content from about 1 to 10% by weight, preferably from about 2 to 6% by weight, and
  a 1-butylene content from about 3 to 20% by weight, preferably from about 8 to 10% by weight, in each case based on the total weight of the terpolymer, or a blend of an ethylene-propylene-1-butylene terpolymer and a propylene-1-butylene copolymer
  having an ethylene content from about 0.1 to 7% by weight
  and a propylene content from about 50 to 90% by weight
  and a 1-butylene content from about 10 to 40% by weight, in each case based on the total weight of the polymer blend.

The propylene homopolymer which may be employed in the outer layer generally comprises predominantly (at least about 90%) propylene and has a melting point of 140° C. or above, preferably from about 150° to 170° C. Isotactic homopolypropylene having an n-heptane-soluble content of 6% by weight or less, based on the isotactic homopolypropylene, is preferred. The homopolymer of the outer layer or the homopolymer present therein generally has a melt flow index of about 0.5 g/10 min to 15 g/10 min, preferably from about 2.0 g/10 min to 10 g/10 min.

The above-described copolymers employed in the outer layer generally have a melt flow index from about 2 to 20 g/10 min, preferably from about 4 to 15 g/10 min. The melting point is generally in the range from about 120° to 140° C. The terpolymers employed in the outer layer generally have a melt flow index in the range from about 2 to 20 g/10 min, preferably from about 4 to 15 g/10 min, and a melting point in the range from about 120° to 140° C. The above-described blend of copolymers and terpolymers generally has a melt flow index from about 5 to 9 g/10 min and a melting point from about 120° to 150° C. All the melt flow indices given above are measured at 230° C. and a force of 21.6 N (DIN 53 735).

If desired, the outer layer polymers can be degraded by peroxide in the same way as described above for the base layer, using the same peroxides. The degradation factor for the outer layer polymers is generally in the range from about 3 to 15, preferably from about 6 to 10.

In an embodiment having a matte finish, the outer layer additionally contains a high density polyethylene (HDPE), which is mixed or blended with the above-described outer layer polymers.

For the purposes of the present invention, HDPE is taken to mean high-pressure polyethylenes which have the following properties:

1. The melt flow index MFI, measured in accordance with DIN 53 735 or ISO 1133 at 50 N/190° C., is in the range from about 0.2 to 50 g/10 min, preferably from about 1.5 to 45 g/10 min, more preferably from about 5 to 25 g/10 min.

2. The viscosity index, measured in accordance with DIN 53 728, Part 4, or ISO 1191, is in the range from about 100 to 450 $cm^3/g$, preferably from about 120 to 280 $cm^3/g$.

3. The crystallinity is from about 35 to 80%, preferably from about 50 to 80%.

4. The density, measured at 23° C. in accordance with DIN 53 479, Method A, or ISO 1183, is in the range from about 0.93 to 0.97 $g/cm^3$, preferably from about 0.95 to 0.96 $g/cm^3$.

5. The melting point, as measured by a differential scanning calorimeter (DSC) (maximum of the melting curve, heating rate 20° C./min) is between about 120° and 150° C., preferably between about 125° and 135° C.

The composition and further details of the matte outer layers are described, in German Patent Application No. 43 13 430.0, which is expressly incorporated herein by way of reference.

If desired, relatively high-molecular-weight resins can likewise be added to the outer layer(s) in the same way as described above for the base layer. In the same way, resins having a molecular weight of at least 1500 should be used in the outer layers. The outer layers generally contain from about 5 to 40% by weight, preferably about 5 to 30% by weight, more preferably from about 5 to 20% by weight, of resin. Embodiments having resin-containing outer layers are particularly advantageous with respect to their appearance, such as sheen and transparency. In general, the resin-containing outer layers should additionally contain antiblocking agents and/or lubricants in order to ensure satisfactory passage through the machine by reducing the tendency to stick.

The multilayer film according to the invention comprises at least the above-described resin-containing base layer and at least one outer layer. Depending on its intended application, the multilayer film according to another embodiment of the present invention may have a further outer layer on the opposite side. If desired, one or more interlayer(s) may be applied between the base layer and the outer layer(s).

Preferred embodiments of the multilayer film have three layers. The structure, thickness and composition of a second outer layer can be selected independently of the outer layer which is already present. The second outer layer can comprise one of the above-described polymers or polymer mixtures, which may or may not be identical to that of the first outer layer. However, the second outer layer may also comprise any other conventional outer layer polymer.

The thickness of the outer layer(s) is generally greater than about 0.2 μm, preferably in the range from about 0.3 to 5 μm, more preferably from about 0.4 to 3 μm, where the outer layers on both sides can have identical or different thicknesses.

The overall thickness of the multilayer propylene polymer film according to the invention can vary within broad limits and depends on the intended use. It is preferably from about 5 to 100 μm, preferably from about 10 to 60 μm. The base layer makes up from about 50 to 96% of the overall film thickness.

The density of the film is generally about 0.9 g/cm$^2$ or above, preferably in the range from about 0.9 to 0.97 g/cm$^2$.

In order to improve the adhesion properties of the outer layer(s), at least one surface of the film may be corona- or flame-treated. If desired, the corresponding treatment can be carried out on both surfaces and can be identical or different.

In order further to improve specific properties of the polyolefin film according to the invention, both the base layer and the outer layer(s) may further contain effective amounts of additives, preferably antistatics and/or antiblocking agents and/or lubricants and/or stabilizers and/or neutralizers, which are compatible with the propylene polymers of the base layer and the outer layer(s), with the exception of the antiblocking agents, which are generally incompatible. All amount data hereinafter described is in percent by weight (% by weight) and in each case relates to the layer or layers to which the additive can be added.

Any desired antistatic may be used. Preferred antistatics are alkali metal alkanesulfonates, polyether-modified, i.e., ethoxylated and/or propoxylated polydiorganosiloxanes (polydialkylsiloxanes, polyalkylphenylsiloxanes and the like) and/or essentially straight-chain and saturated aliphatic, tertiary amines containing an aliphatic radical having 10 to 20 carbon atoms which are substituted by ω-hydroxy-($C_1$–$C_4$)alkyl groups. N,N-bis(2-hydroxyethyl)alkylamines having 10 to 20 carbon atoms, preferably 12 to 18 carbon atoms, in the alkyl radical being particularly suitable. The effective amount of antistatic is in the range from about 0.05 to 0.5% by weight. Glycerol monostearate is also preferably employed as antistatic, in an amount from about 0.03% to 0.5%.

Suitable antiblocking agents include any known in the art. Preferred antiblocking agents are inorganic additives such as silicon dioxide, calcium carbonate, magnesium silicate, aluminum silicate, calcium phosphate and the like and/or incompatible organic polymers such as polyamides, polyesters, polycarbonates and the like. Preference is given to benzoguanamine-formaldehyde polymers, silicon dioxide and calcium carbonate. The effective amount of antiblocking agent is in the range from about 0.1 to 2% by weight, preferably from about 0.1 to 0.8% by weight. The mean particle size is between about 1 and 6 μm, preferably about 2 and 5 μm. Particles having a spherical shape are particularly suitable. These particles are described in EP-A-0 236 945 and DE-A- 38 01 535, which references are expressly incorporated herein in their entireties. The antiblocking agents are preferably added to the outer layers.

Any desired lubricant may be used. Preferred lubricants are higher aliphatic acid amides, higher aliphatic acid esters, waxes and metal soaps and polydimethylsiloxanes. The effective amount of lubricant is in the range from about 0.01 to 3% by weight, preferably from about 0.02 to 1% by weight. Particularly suitable is the addition of higher aliphatic acid amides in the range from about 0.01 to 0.25% by weight in the base layer and/or the outer layers. A particularly suitable aliphatic acid amide is erucamide.

The addition of polydimethylsiloxanes is preferred in the range from about 0.02 to 2.0% by weight, in particular polydimethylsiloxanes having a viscosity from about 10,000 to 1,000,000 mm$^2$/s. Particularly favorable is the addition of polydimethylsiloxanes in one or both outer layers.

Stabilizers which can be employed are conventional compounds which have a stabilizing action for polymers of ethylene, propylene and other α-olefins. Their added amount is between about 0.05 and 2% by weight. Particularly suitable are phenolic stabilizers, alkali metal or alkaline earth metal stearates and/or alkali metal or alkaline earth metal carbonates.

Phenolic stabilizers are preferred in an amount from about 0.1 to 0.6% by weight, in particular from about 0.15 to 0.3% by weight, and having a molecular weight of greater than about 500 g/mol. Pentaerythritol tetrakis[3-(3,5-di-tert-butyl-4-hydroxyphenyl)propionate] and 1,3,5-trimethyl-2,4,6-tris(3,5-di-tert-butyl-4-hydroxybenzyl)benzene are particularly advantageous.

Neutralizers are preferably calcium stearate and/or calcium carbonate having a mean particle size of at most about 0.7 μm, an absolute particle size of less than about 10 μm and a specific surface area of at least about 40 m$^2$/g.

Another aspect of the invention relates to a process for the production of the multilayer film according to the invention. Any desired process can be used. Preferably, the coextrusion process, which is known per se is used. This process is carried out by coextruding the melts corresponding to the individual layers of the film through a flat-film die, taking off the resultant film over one or more rolls for solidification, subsequently biaxially stretching (orienting) the film, heat-setting the biaxially stretched film and, if desired, corona-treating the surface layer intended for corona treatment. The biaxial stretching (orientation) is generally carried out consecutively. Consecutive biaxial stretching, in which stretching is carried out first longitudinally (in the machine direction) and then transversely (perpendicular to the machine direction), is preferred.

As is conventional in the coextrusion process, the polymer or polymer mixture of the individual layers is compressed and liquified in an extruder, with it being possible for any additives added to be already present in the polymer or polymer mixture or added at this time. The melts are then extruded simultaneously through a flat-film die (slot die), and the extruded multilayer film is drawn off over one or more take-off rolls, where it cools and solidifies.

The resultant film is then stretched longitudinally and transversely to the extrusion direction, which results in alignment of the molecule chains. The longitudinal stretching is advantageously carried out with the aid of two rolls running at different speeds corresponding to the desired stretching ratio. The transverse stretching is advantageously carried out with the aid of an appropriate tenter frame. For the twist wrapping film, the conditions in the longitudinal and transverse directions are selected so that the film has approximately balanced orientation in the longitudinal and transverse directions and has substantially isotropic mechanical properties. For example, the ratio between the permanent set or tear strength in the transverse direction and the permanent set or tear strength in the longitudinal direction is at most about 2. The prerequisites for achieving very good twist properties are then particularly favorable.

It has furthermore been found that better twist properties are obtained the more the film has been stretched in the longitudinal direction. The longitudinal stretching ratios according to the invention are from about 5 to 9, preferably from about 5.5 to 8. The transverse stretching ratios should also be selected accordingly. The preferred transverse stretching ratio range is from about 5 to 9. Unlike other packaging films, the film of the present invention is not highly stretched in the transverse direction. The use of a longitudinal stretching ratio of λ=4.5 and a transverse stretching ratio of λ=10 gives a film having comparatively poor twist properties, even in the case of addition of large amounts of resin. In order to achieve the twist properties essential to the invention, a ratio between the stretching ratios in the transverse and longitudinal directions of less than about 2, preferably less than about 1.5, should be observed. This ratio is particularly preferably in the range from about 0.5 to 1.5.

Stretching of the film in transverse direction is generally carried out by first stretching the film to a maximum width in the tenter frame. Thereafter, the tenter frame slightly converges again, so that the film's final width is smaller than the maximum width of the tenter frame. The convergence is calculated from the maximum width $W_{max}$ of the tenter frame and the film's final width $W_{film}$ according to the following formula:

$$\text{convergence} = \frac{W_{max} - W_{film}}{W_{max}}$$

The transverse stretching ratio λ is calculated from the film's final width $W_{film}$, the width of the unstretched edge of the film $W_{edge}$ and the width of the solely lengthwise stretched film $W_{length}$ according to the following formula:

$$\lambda = \frac{W_{film} - 2 \cdot W_{edge}}{W_{length} - 2 \cdot W_{edge}}$$

Biaxial stretching of the film is followed by heat-setting (heat treatment), with the film generally being kept at a temperature from about 100° to 160° C. for about 0.1 to 10 seconds. The film is subsequently wound up in the conventional manner by means of a wind-up unit.

It has proven particularly favorable to keep the take-off roll or rolls at a temperature from about 10° to 100° C., preferably from about 20° to 70° C. by means of a heating and cooling circuit. This serves to cool and solidify the extruded film.

The temperatures at which longitudinal and transverse stretching are carried out can vary in a relatively broad range and depend on the respective composition of the base and outer layer mixture and on the desired properties of the film. Generally, the longitudinal stretching is preferably carried out at from about 80° to 150° C. and the transverse stretching is preferably carried out at from about 120° to 170° C.

If desired, one or both surfaces of the film can, as mentioned above, be corona- or flame-treated by one of the known methods after the biaxial stretching. The treatment intensity is generally in the range from 37 to 50 mN/m, preferably from 39 to 40 mN/m.

In the case of corona treatment an expedient procedure is to pass the film between two conductor elements serving as electrodes. A high voltage, usually alternating voltage (from about 5 to 20 kV and from about 5 to 30 kHz), is applied between the electrodes so that spray or corona discharge can occur. The spray or corona discharge ionizes the air above the film surface and reacts with the molecules of the film surface, causing formation of polar inclusions in the essentially non-polar polymer matrix.

For flame treatment with a polarized flame (see U.S. Pat. No. 4,622,237), a direct electric voltage is applied between a burner (negative pole) and a chill roll. The level of the applied voltage is between about 400 and 3000 V, preferably in the range from about 500 to 2000 V. The applied voltage gives the ionized atoms increased acceleration, and they hit the polymer surface with greater kinetic energy. The chemical bonds within the polymer molecule are more easily broken, and formation of free radicals proceeds more rapidly. Heating of the polymer in this treatment is substantially less than in the case of standard flame treatment, and films can be obtained in which the heat-sealing properties of the treated side are even better than those of the untreated side.

It has been found that incorporation of resin having a molecular weight of at least about 1500 into the base layer of the film has advantageous effects. The resin contributes in a desired manner toward improving the twist properties, but at the same time has very low migration values. Thus, a film which can be used for the twist wrapping of chocolate-containing candy has been provided for the first time. Previously known films could not be employed due to migration of the resin into the food. It has furthermore been found that, in addition to the mean molecular weight of the resin of at least about 1500, its molecular weight distribution in the region of molecular weights below about 1000 additionally plays a role in migration. While the known art predominantly teaches the use of precisely these low-molecular-weight resins or regards the molecular weight or molecular weight distribution as unimportant, it has now been precisely found that these low-molecular-weight constituents migrate considerably. It is therefore particularly advantageous if, in addition to a minimum value for the mean molecular weight of about 1500, it is additionally ensured that the constituents of the resin are as low as possible in the region below about 1000.

Surprisingly, the desired mechanical film properties are also achieved by means of these relatively high-molecular-weight resins.

The embodiments of the film with approximately balanced orientation are distinguished by excellent twist properties. The twist properties of the film can be well described by two physical parameters of the film. The two parameters are: the permanent set in the longitudinal and transverse directions; and the elongation at break in the longitudinal direction. The twist properties are better the higher the permanent set in both the longitudinal and transverse directions; and the smaller the elongation at break in the longitudinal direction. The values of the above physical parameters should be approximately the same in both directions. The relationship between the values for permanent set $D_t:D_1$ is generally less than about 2.0., preferably in the range from about 0.5 to 1.5, more preferably in the range from about 0.7 to 1.3. The values for transverse and longitudinal elongation at break also form the corresponding ratios.

Good twist properties are obtained if the permanent set values for both directions are greater than about 50%, preferably in the range from about 50 to 90%.

The elongation at break is determined in accordance with DIN 53 455. The films according to the invention have elongation at break values in both directions of less than about 160%, preferably less than about 130%.

In summary, the multilayer film according to the invention is distinguished by a combination of properties which hitherto could not be achieved at the same time in a film. The properties include:

very good twist properties,
very good migration behavior, in particular low migration in fat-containing foods,
no resin deposition on the rolls,
no mutual blocking of the film packaging, and
very good scratch resistance.

This combination of properties provides for the first time according to the present invention a film which can be used commercially as a twist wrapping film, for example for chocolate-containing candy.

The raw materials and films were characterized using the following measurement methods:

Melt Flow Index

The melt flow index was measured in accordance with DIN 53 735 at a load of 21.6 N and 230° C., or at a load of 50 N and 190° C.

Melting Point

DSC measurement, maximum of the melting curve, heating rate 20° C./min.

Viscosity Index J

The viscosity index is a measure of the molecular weight. The viscosity index is measured in accordance with DIN 53 728, Part 4, in 0.1% strength decahydronaphthalene solution at 135° C.

Density ρ

The density is determined in accordance with DIN 53 479, Method A.

Degree of Crystallization α

The degree of crystallization can be determined from the following equation:

$$\alpha = \frac{\rho - \rho_{amorphous}}{\rho_{crystalline} - \rho_{amorphous}} \cdot 100\%$$

where

ρamorphous=0.8549 g/cm³

ρcrystalline=1.0005 g/cm³

ρ=density of the HDPE grade employed.

Haze

The haze of the film was measured in accordance with ASTM-D 1003-52.

Sheen

The sheen was determined in accordance with DIN 67 530. The reflection value was measured as an optical parameter for the surface of a film. In accordance with the standards ASTM-D 523-78 and ISO 2813, the angle of incidence was set at 60° or 85°. A light beam hits the planar test surface at the set angle of incidence and is reflected or scattered thereby. The light beams incident on the photoelectronic receiver are indicated as a proportional electrical quantity. The measurement value is dimensionless and must be specified together with the angle of incidence.

Roughness

The roughness was determined in accordance with DIN 4768.

Friction

The friction was determined in accordance with DIN 53 375.

Surface Tension

The surface tension was determined by the ink method (DIN 53 364).

Printability

The corona-treated films were printed 14 days after production (short-term assessment) and 6 months after production (long-term assessment). The ink adhesion was assessed by an adhesive-tape test. If a small amount of ink was removable by means of an adhesive tape, the ink adhesion was assessed as being moderate, and if a significant amount of ink was removable, it was assessed as being poor.

Determination of the Permanent Set

Figure 4:
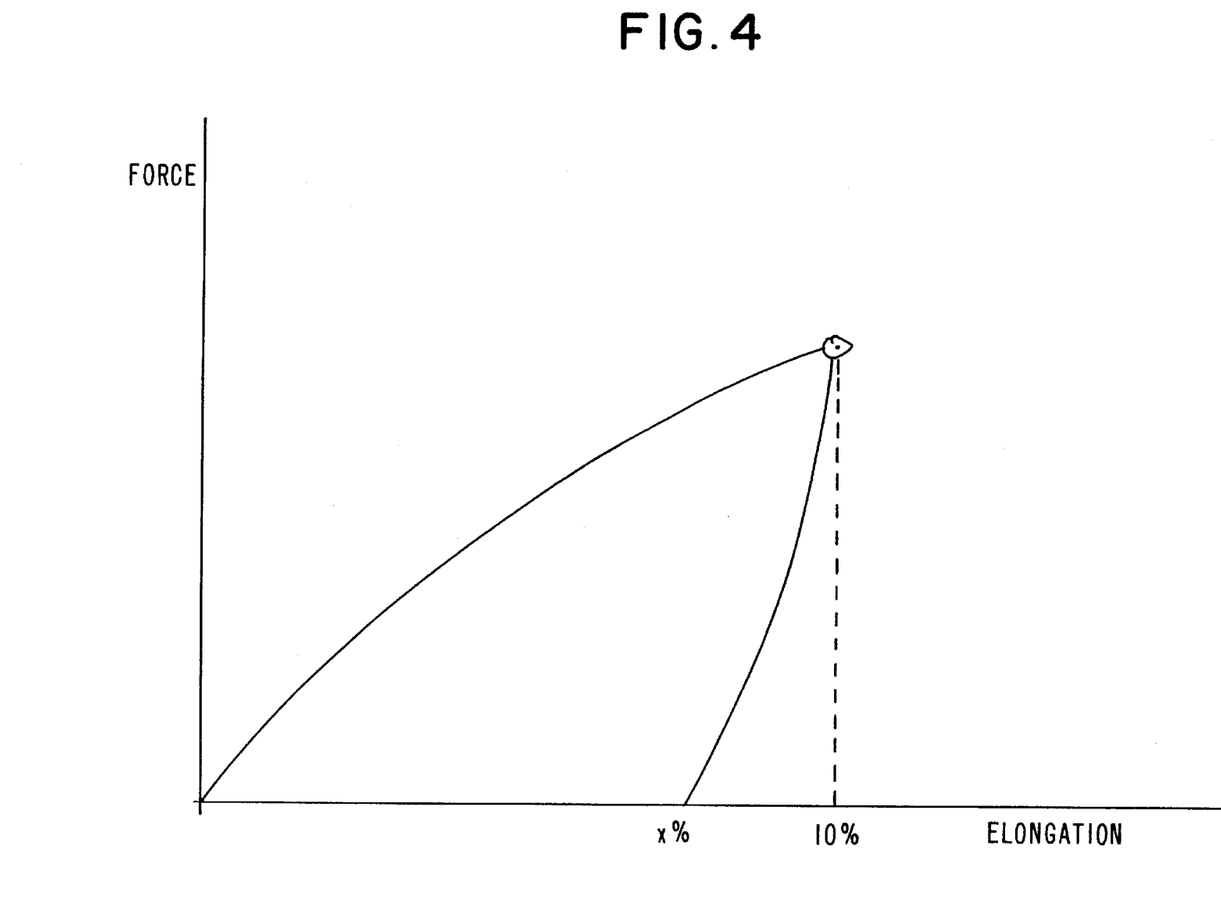
FIG. 4 shows a stress/strain diagram used for determining the permanent set of the multilayer film.

A 15 mm wide strip was cut out of the film perpendicular to the machine direction and clamped in a tensile testing machine, the distance between the clamps being 200 mm. The sample was then stretched at 20 mm/min, corresponding to 10%/min. After an elongation of 10%, i.e., at a sample length of 220 mm, the sample was automatically relaxed at the same rate. The determination of the permanent set from the stress/strain diagram is shown diagrammatically in FIG. 4. The permanent set is calculated from $$D_b = \frac{X\%}{10\%} \cdot 100\%$$

Molecular Weight Determination Mw

In order to determine the mean molecular weight Mw, three-detector gel permeation chromatography is used. The substance is dissolved in an eluent, such as THF, and passed through a separation column. The separation column is 90 cm in length and is filled with a porous support material whose pore size is 5 μm. Detection is carried out by UV absorption spectroscopy at various wavelengths and by means of refractive index and light scattering capacity of the fractions. The calibration is carried out by means of a standard compound of known molecular weight. Comparison of the UV absorption of the standard substance with the absorption of the sample enables the assignment of molecular weights.

Figure 1:
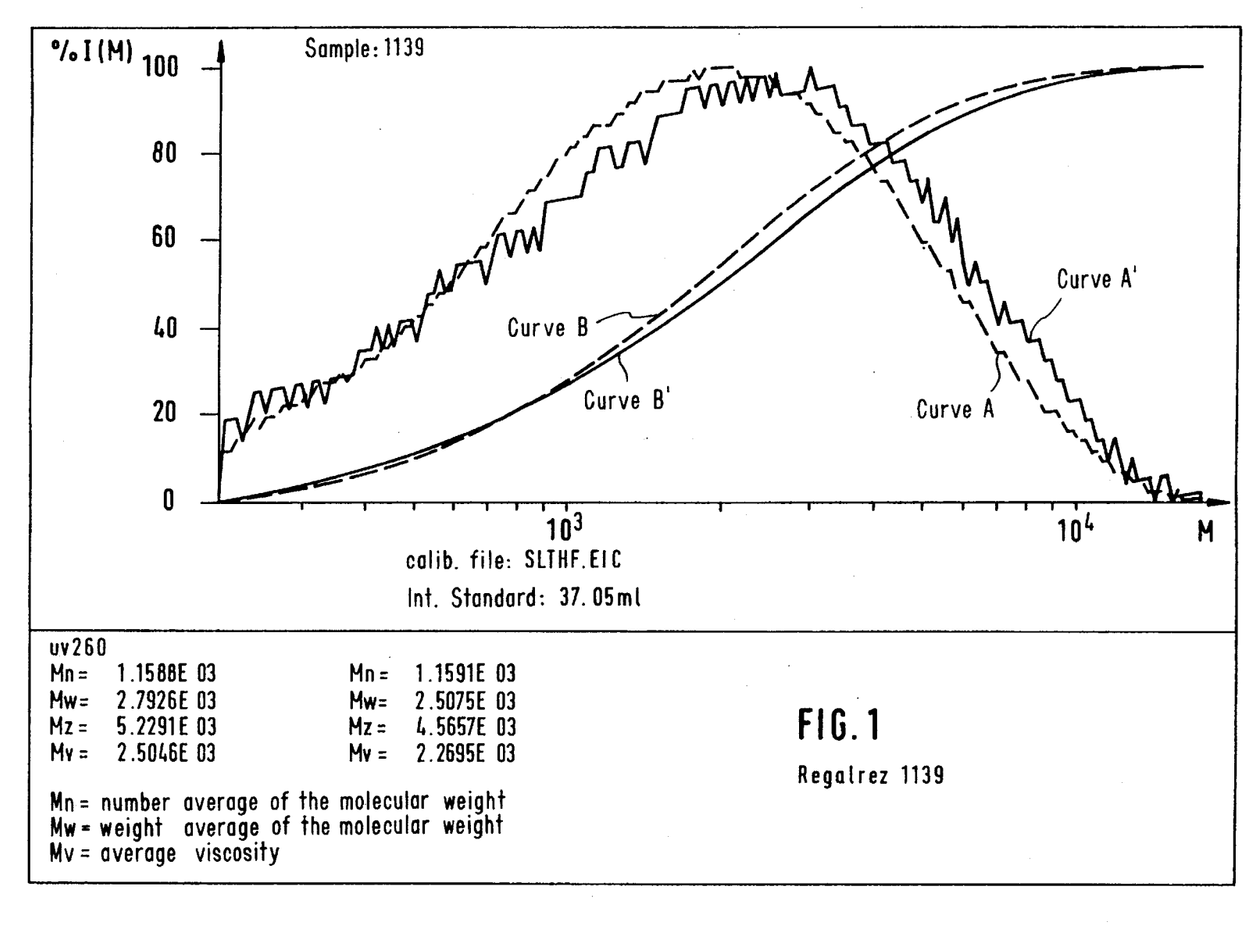
FIG. 1 shows the weight distribution curve of the hydrocarbon resin Regalrez 1139.

In a diagram (for example FIGS. 1 to 3) the molecular weight of the single fractions (assumed to have about the same molecular weight) is plotted against their proportions in weight percent. Such a diagram is called a distribution curve (e. g. Curve A, FIG. 1). The integral curve (Curve B) additionally shows the proportion in sum of a fraction having a molecular weight up to a certain value. For example, point X at Curve B in FIG. 1 shows that a proportion of 25% of the resin has a molecular weight of less than 1000. The mean molecular weight is calculated from the maximum of the distribution curve.

Migration Behavior

In order to test the migration behavior, circular film samples are brought into contact on one side, the side to be tested, with the $^{14}$C-labeled test fat HB 307. In this test, 120 ml of fat are applied to an area of 0.62 dm². The samples are stored for 10 days at 40° C. in migration cells. The migration values are determined by the K. Figge method given in Bundesgesundheitsblatt 18 (1975), 27.

Scratch Resistance or Scratch Sensitivity

The scratch resistance is determined in accordance with DIN 53 754. The scratch resistance is determined using a Taber 503 Abraser abrasion tester from Teledyne Taber, using Calibrade R H18 friction wheels loaded with 250 g. The scratch resistance or scratch sensitivity is defined as the increase in haze of the scratched film compared with the original film after 50 revolutions of the sample plate. The scratch resistance is scored very good (++) if the increase in haze is less than 22%, good (+) if the increase in haze is from 22 to 25%, moderate (±) if the increase in haze is from 25 to 30%, and poor (−) if the increase in haze is greater than 30%.

EXAMPLE 1

A symmetrical three-layer film having an overall thickness of 21 μm was produced by coextrusion followed by stepwise orientation in the longitudinal and transverse directions. The outer layers each had a thickness of 0.4 μm.

Base Layer A:

71.7% by weight of isotactic polypropylene

28% by weight of hydrocarbon resin [Regalrez® 1139 from Hercules Inc. (copolymer of α-methylstyrene and vinyltoluene)] having a softening point of 140° C. and a molecular weight of 2500

0.2% by weight of N,N-bisethoxyalkylamine and 0.1% by weight of Erucamide.

The melt flow index of the mixture was
MFI$_{21.6N}$=10 g/10 min or
MFI$_{50.0N}$=50 g/10 min.

Outer Layers B:
99.2% by weight of random ethylene-propylene copolymer having a C$_2$-content of 4.5% by weight
0.3% by weight of SiO$_2$ as antiblocking agent having a mean particle size of 3 μm
0.5% by weight of polydimethylsiloxane having a viscosity of 30,000 mm$^2$/s.

The melt flow index of the outer layer was
MFI$_{21.6N}$=12 g/10 min or
MFI$_{50.0N}$=60 g/10 min.

The production conditions in the individual process steps were:

| | | |
|---|---|---|
| Extrusion: | Temperatures | Layer A: 190° C. |
| | | Layers B: 270° C. |
| | Temperature of the take-off roll: 30° C. | |
| Longitudinal stretching: | Temperature T = 110° C. | |
| | Longitudinal stretching ratio = 6.0 | |
| Transverse stretching: | Temperature T = 150° C. | |
| | Transverse stretching ratio = 7.3 | |
| | Convergence 25% | |
| Setting: | Temperature T = 110° C. | |

The hydrocarbon resin employed had the molecular weight distribution shown in FIG. 1. The proportion of resin having a molecular weight of less than 1000 was about 28%.

The film produced in this way had the properties listed in the table. Before being rolled up, the film was subjected to corona treatment in order to ensure printability. The surface tension of the film as a consequence of this treatment was 42 mN/m.

EXAMPLE 2

As in Example 1, a three-layer film having an overall thickness of 21 μm with outer layer thicknesses of 0.4 μm each was produced. In contrast to Example 1, the resin content was now 20% by weight in the base layer. The type of resin remained the same. The extrusion temperatures were kept the same. Due to the lower resin content, the conditions in the longitudinal and transverse stretching were modified as follows:

Longitudinal Stretching:
Temperature T=115° C.
Longitudinal stretching ratio=7.2
Transverse Stretching:
Temperature T=152° C.
Transverse stretching ratio=7.2
Convergence 20%
Setting temperature T=110° C.

Film properties for Example 2 are listed in the table.

EXAMPLE 3

Compared with the above Examples (1 and 2), the resin content was reduced to 15%. The conditions in the stretching units were as follows:

Longitudinal Stretching:
Temperature T=120° C.
Longitudinal stretching ratio=7.7
Transverse Stretching:
Temperature T=153° C.
Transverse stretching ratio=7.2
Convergence 20%
Setting temperature T=110° C.

EXAMPLE 4

Compared with Example 1, only the composition of the outer layer was changed. This now contained polypropylene containing 15% by weight of the resin used in Example 1 (based on the total weight of the outer layer). As shown by the table, this slightly improved the permanent set, but also improved the appearance of the film. The production conditions were the same as in Example 1.

EXAMPLE 5

Compared with Example 1, a hydrocarbon resin having a molecular weight of 2100 [Regalrez® 1128 (copolymer of α-methylstyrene and vinyltoluene)] was now used. The processing conditions were the same as in Example 1.

COMPARATIVE EXAMPLE 1

Compared with Example 1, a hydrocarbon resin (cyclopentadiene resin) having a molecular weight of about 860 (Escorez® ECR 356) was now used. The production conditions were the same as in Example 1. Deposition of resin on the rolls was considerable, the packaged candy tended to block, and, in particular, the migration behavior into fat was poor.

Figure 2:
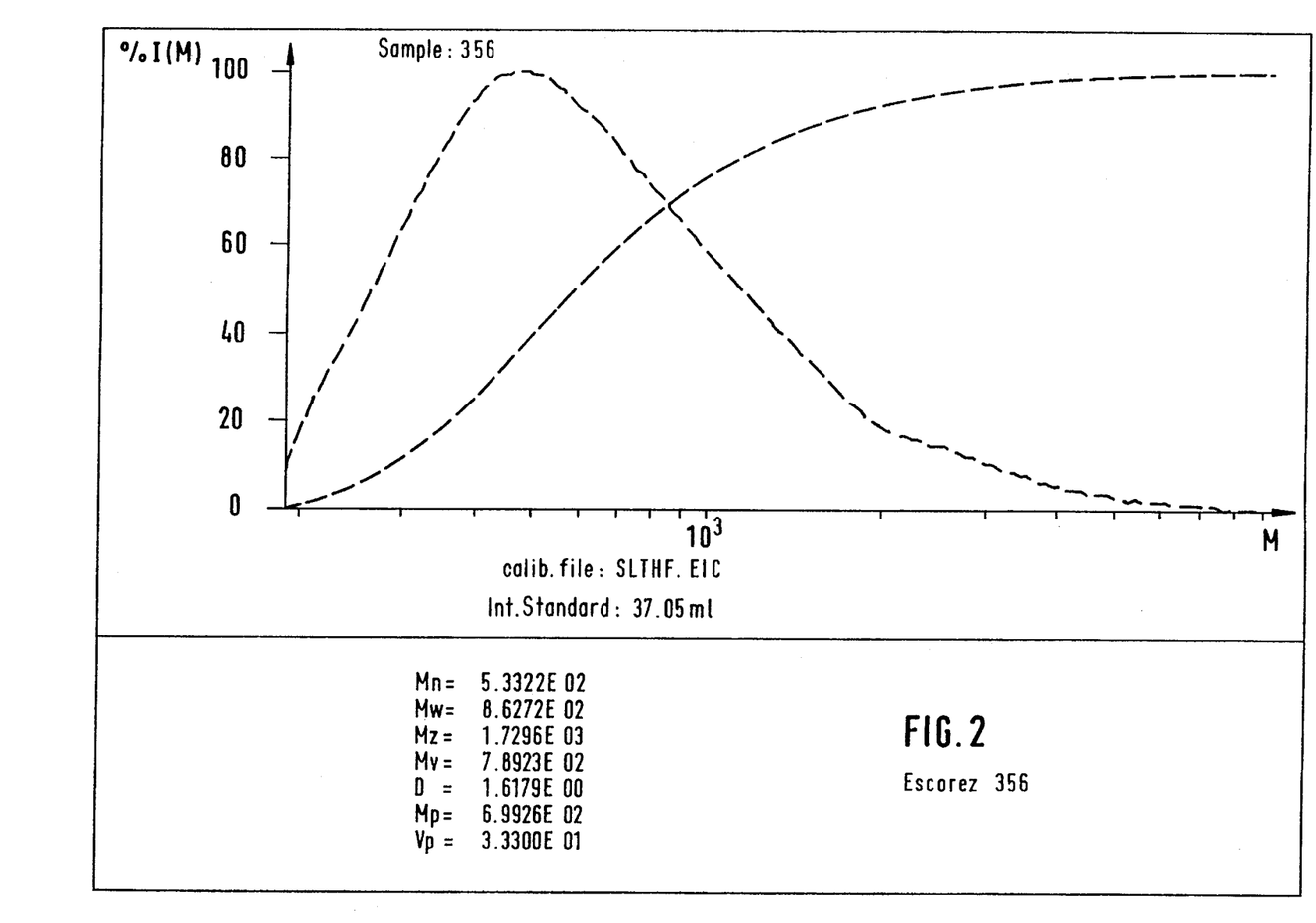
FIG. 2 shows the weight distribution curve of the hydrocarbon resin Escorez 356.

The resin had the molecular weight distribution shown in FIG. 2. The proportion of resin having a molecular weight of less than 1000 was about 70%.

COMPARATIVE EXAMPLE 2

Compared with Comparative Example 1, a hydrocarbon resin (styrene resin) having a molecular weight of 1000 (Arkon® P125) was now used. The process conditions were the same as in Comparative Example 1. As in Comparative Example 1, the properties were significantly worse than in the film according to the invention.

Figure 3:
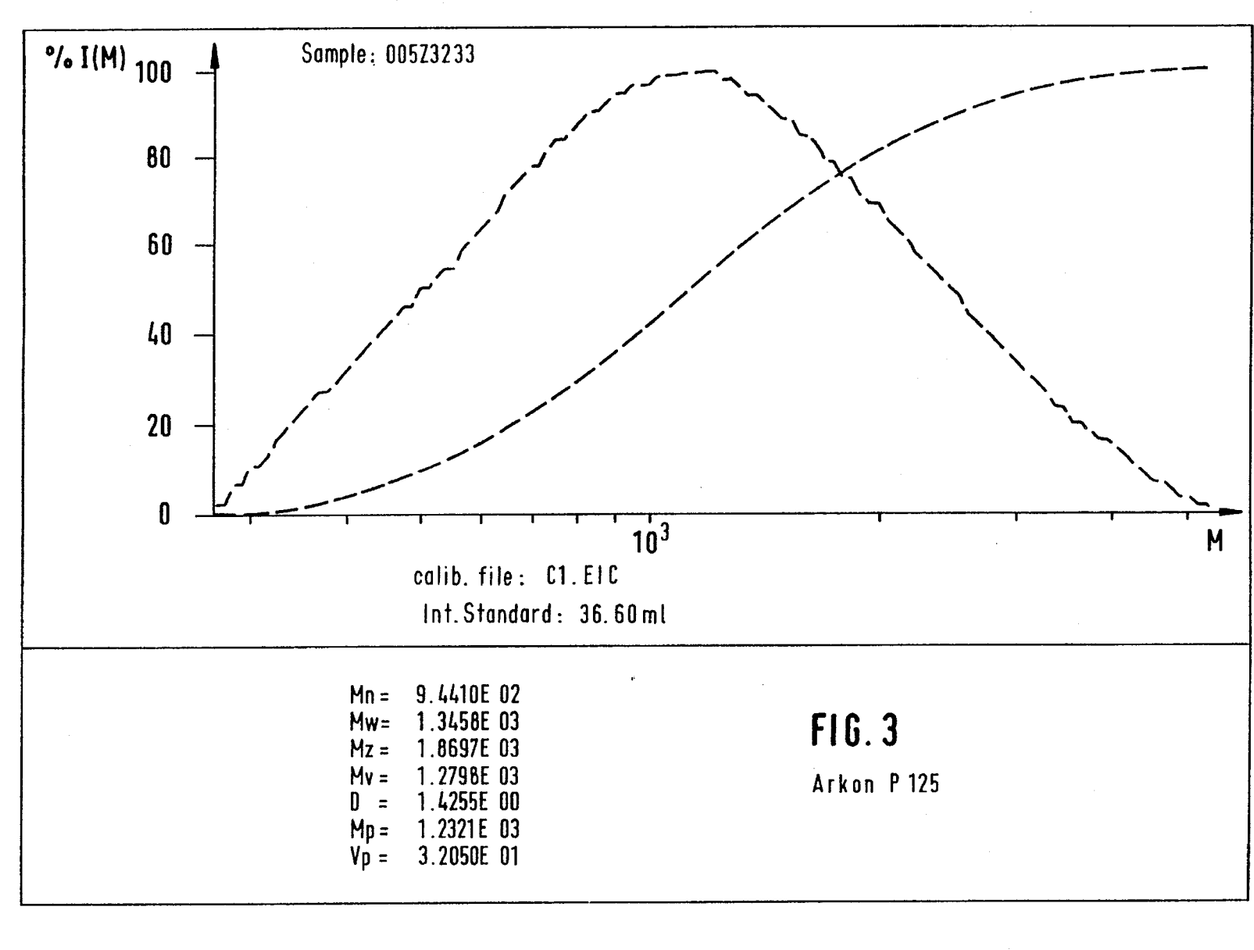
FIG. 3 shows the weight distribution curve of the hydrocarbon resin Arkon P125.

The resin had the molecular weight distribution shown in FIG. 3. The proportion of resin having a molecular weight of less than 1000 was about 40%.

Other embodiments of the invention will be apparent to those skilled in the art from consideration of the specification and practice of the invention disclosed herein. It is intended that the specification be considered as exemplary only, with the true scope and spirit of the invention being indicated by the following claims.

TABLE

| | Permanent set % | | Modulus of elasticity N/mm² | Elongation at % | | Haze | Scratch resistance | Deposition | Blocking during further | Migration |
|---|---|---|---|---|---|---|---|---|---|---|
| | long. | transv. | long./trans. | long./trans | Sheen | % | ΔHaze | on rolls | processing | into fat |
| E1 | 61 | 62 | 3200/3300 | 120/80 | 105 | 2.3 | 22 | ++ | ++ | ++ |
| E2 | 60 | 61 | 3100/3300 | 105/85 | 105 | 2.2 | 24 | +++ | +++ | +++ |
| E3 | 61 | 60 | 3200/3400 | 95/88 | 108 | 2.1 | 22 | ++++ | ++++ | ++++ |
| E4 | 63 | 65 | 3300/3500 | 110/85 | 130 | 1.7 | 15 | + | + | ++ |
| E5 | 62 | 63 | 3300/3400 | 118/85 | 103 | 2.2 | 23 | + | + | + |
| CE1 | 64 | 62 | 3250/3400 | 115/90 | 105 | 2.1 | 23 | − | − | − |
| CE2 | 62 | 63 | 3300/3500 | 118/87 | 102 | 2.2 | 24 | − | − | − |

E = Example;
CE = Comparative example
+ = no deposition, no blocking, no migration into fat
− = deposition, blocking, migration

What is claimed is:

1. A multilayer propylene polymer film, comprising: a base layer which comprises a propylene polymer and a copolymer of α-methylstyrene and vinyltoluene resin having a mean molecular weight Mw of ≧ about 2100; and an outer layer comprising α-olefinic polymers formed of α-olefins having 2 to 10 carbon atoms.

2. A multilayer propylene polymer film as claimed in claim 1, wherein the resin has a mean molecular weight Mw from ≧ about 2100 up to about 8000.

3. A multilayer propylene polymer film as claimed in claim 2, wherein the resin has a mean molecular weight Mw from about 2500 to 6500.

4. A multilayer propylene polymer as claimed in claim 1, wherein the proportion of the methylstyrene and vinyltoluene copolymer resin having a molecular weight of less than 1000 is at most about 35% by weight, based on the total weight of the resin.

5. A multilayer propylene polymer film as claimed in claim 4, wherein the proportion of resin having a molecular weight of less than 1000 is from about 1 to 30%, based on the total weight of the resin.

6. A multilayer propylene polymer film as claimed in claim 1, wherein the base layer comprises from about 3 to 40% by weight of resin, based on the weight of the base layer, and the resin has a softening point from about 80° to 180° C.

7. A multilayer propylene polymer film as claimed in claim 6, wherein the base layer comprises from about 10 to 35% by weight of resin.

8. A multilayer propylene polymer film as claimed in claim 1, wherein the multilayer film has a permanent set value in the longitudinal and transverse directions of greater than about 50%.

9. A multilayer propylene polymer film as claimed in claim 1, wherein the propylene polymer of the base layer has a melting point of at least about 140° C. and the melt flow index is in the range from about 0.5 to 15 g/10 min.

10. A multilayer propylene polymer film as claimed in claim 1, wherein the polymer of the outer layer is selected from the group consisting of a propylene homopolymer, a copolymer of ethylene and propylene, a copolymer of ethylene and butylene, a copolymer of propylene and butylene, a copolymer of ethylene and another α-olefin having 5 to 10 carbon atoms, a copolymer of propylene and another α-olefin having 5 to 10 carbon atoms, a terpolymer of ethylene and propylene and butylene, a terpolymer of ethylene and propylene and another α-olefin having 5 to 10 carbon atoms, mixtures of blends thereof, and a blend of two or more of said homopolymers, copolymers and terpolymers, mixed with one or more of said homopolymers, copolymers and terpolymers.

11. A multilayer propylene polymer film as claimed in claim 1, wherein the outer layer further comprises an high density polyethylene having a melt flow index from about 0.2 to 50 g/10 min, a viscosity index from about 100 to 450 cm³/g, a density from about 0.93 to 0.97 g/cm³, a degree of crystallization from about 35 to 80% and a melting point of 120° to 150° C.

12. A multilayer propylene polymer film as claimed in claim 1, wherein the outer layer further comprises a resin having a mean molecular weight of ≧ about 1500.

13. A multilayer propylene polymer film as claimed in claim 1, further comprising a second outer layer which comprises α-olefinic polymers formed of α-olefins having 2 to 10 carbon atoms.

14. A process for the production of the multilayer propylene polymer film as claimed in claim 1, comprising the steps of: coextruding the melts corresponding to the individual layers of the film through a flat-film die; taking the coextruded film off over a take-off roll whose temperature is between 10° and 100° C.; biaxially stretching the film at a longitudinal stretching ratio from 5:1 to 9:1 and a transverse stretching ratio from 5:1 to 9:1; and heat-setting the biaxially stretched film.

15. The process according to claim 14, further comprising the step of corona-treating the heat-set film.

16. The process as claimed in claim 14, wherein the longitudinal stretching of the film is carried out at from about 80° to 150° C. and the transverse stretching is carried out from about 120° to 170° C.

17. The process as claimed in claim 14, wherein the film has approximately balanced orientation as evidenced by a tear strength ratio of at most about 2:1 between the transverse direction and the longitudinal direction.

18. A packaged article, comprising the multilayer propylene polymer film of claim 1 twist wrapped around an article.

19. A packaged article as claimed in claim 18, wherein the article comprises a fat-containing food article.

20. A packaged article as claimed in claim 19, wherein the article comprises a chocolate food article.

* * * * *